UNITED STATES PATENT OFFICE.

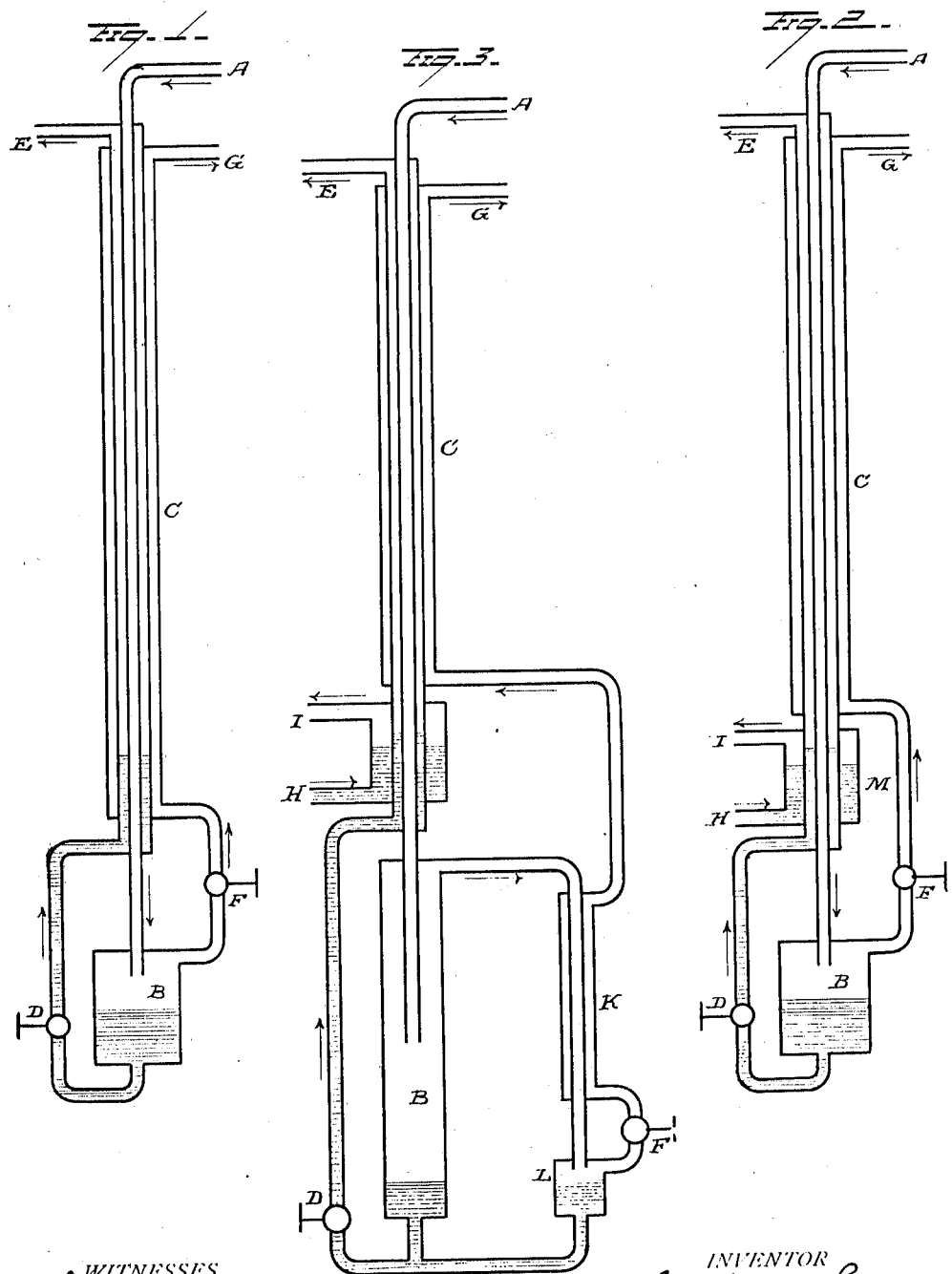

CARL von LINDE, OF MUNICH, GERMANY.

PROCESS FOR THE PRODUCTION OF HYDROGEN FROM GAS MIXTURES CONTAINING HYDROGEN.

1,020,102. Specification of Letters Patent. Patented Mar. 12, 1912.

Application filed October 10, 1910. Serial No. 586,325.

*To all whom it may concern:*

Be it known that I, CARL VON LINDE, of Munich, in the Kingdom of Bavaria, Germany, have invented certain new and useful Improvements in Processes for the Production of Hydrogen from Gas Mixtures Containing Hydrogen; and I do hereby declare the following to be a full, clear, and exact description of the invention, such as will enable others skilled in the art to which it appertains to make and use the same.

This invention relates to an improved process for the production of hydrogen from gas mixtures containing hydrogen.

There are several processes known for the separation of gas mixtures through liquefaction and fractional distillation, but they are not adapted to the separation of gas mixtures which contain hydrogen, because the liquefaction of hydrogen can only take place at a temperature so low that all other gases at this temperature exist only in the solid state.

The object of the above invention is the extraction of hydrogen, by separating it from gas mixtures containing hydrogen (such as illuminating gas or water gas) in such a manner that the less volatile constituents of the gas mixture are condensed through the influence of a reduction of temperature which may also be combined with an increase in pressure. The reduction of the temperature to such a degree as to bring about liquefaction of such constituents, as for example carbon monoxid and nitrogen, of which the critical temperatures are very low, is brought about in such a way that the gas mixture is refined, in that it is compressed, the heat of compression being transferred to cooling water, and then in connection with a heat interchanger, it is expanded with the performance of internal or external work in a manner similar to that in the well-known processes for the liquefaction of air of von Linde and Claude. From these latter, the present process is however different, since the separation of the gas mixture into a liquid portion containing the less volatile constituents and a gaseous portion containing principally hydrogen, takes place before expansion of the compressed gas mixture and for that reason the expansion must take place in two separate apparatus, while with the process for the liquefaction and fractionation of air of von Linde and Claude, the expansion of the gas mixture first takes place through a single expansion mechanism, and then the separation of the gas mixture into its component parts follows afterward.

If the expansion is accomplished as in the von Linde process without the performance of external work, the gas mixture will not furnish the requisite cooling effect if it contains a large proportion of hydrogen, because the "inversion-temperature" lies very low and to reach this, cooling by expansion without external work cannot be applied. In this case the necessary cooling effect is supplemented by the use of liquid air or liquid nitrogen to remove some of the heat of the gas mixture. If the compressed gas mixture is brought to a sufficiently low temperature before expansion, either with or without the aid of liquid air or liquid nitrogen as the case may be, then a separation of all the constituents of the mixture with the exception of the hydrogen takes place as the result of condensation to an extent determined by their partial pressures corresponding to the temperature attained by the pressure applied. As these constituents of which the boiling points are lower than that of nitrogen, together with hydrogen itself do not need to be considered, liquefaction is thus obtained of all the other constituents with the exception of a very small residue by employing liquid nitrogen as a cooling agent. If, however, it is desired to separate this residue as far as possible the cold hydrogen, from which most of the constituents of the gas mixture have already been separated, and which is still under high pressure and at the temperature of ebullition of liquid air or liquid nitrogen, can be utilized in conjunction with a special interchanger in the same way as in the case of apparatus for the liquefaction of hydrogen, and in this way a lower temperature can be attained than that of the evaporating nitrogen. If this low temperature thus obtained in the heat interchanger is transferred to the compressed hydrogen before expansion the remaining constituents of the gas mixture can be separated even to the last traces.

In the accompanying drawings, Figure 1 is a diagrammatic representation of one form of apparatus for carrying out my process. Figs. 2 and 3 are similar views of the same apparatus, each with added features which may be necessary to use under certain conditions.

The general construction of apparatus for carrying out this process is shown diagrammatically in Figs. 1, 2 and 3, the compression gas mixture enters the apparatus at A after it has been previously freed from such constitutents or impurities which can bring about stoppages in the liquefying apparatus, e. g. carbonic acid and sulfur compounds. In its passage through the apparatus to the vessel B, the gas mixture is reduced in temperature to such a degree in the temperature-interchanger C, that the greater part of the constituents of the gas mixture are liquefied and collect in the vessel B. The liquefied portion flows out of this vessel through the expansion mechanism D into the interchanger C, evaporates and thereby removes heat from the compressed gas mixture flowing through the apparatus. The products of this evaporation, e. g. carbon monoxid escape at E, after an interchange of temperature with that of the compressed gas mixture passing through the apparatus and can be applied in any manner desired. The portion of the gas mixture which is not liquid (hydrogen and the remaining constituents) after passing through the expansion mechanism F flows through the temperature-interchanger C in an opposite direction to that of the compressed gas mixture and escapes out of the apparatus at G at normal temperature.

In Fig. 2 is diagrammatically represented an arrangement of apparatus generally similar to that shown in Fig. 1 but to which a vessel or pipe M is added in which atmospheric air or nitrogen is allowed to enter at H in the liquid state and escape at I in the form of gas, if the composition of the gas mixture is such that it does not produce a sufficient cooling effect on expansion and thus renders the use of liquid air or liquid nitrogen necessary.

In Fig. 3 I have shown how a heat interchanger K and the separating vessel L, may be added, if it is desired by separate expansion and the use of a further reduction in temperature attained by means of this expansion, to liquefy all other constituents and thereby to liberate them as far as possible from the hydrogen. After the largest portion of the constituents of the gas mixture has become liquefied in the heat-interchanger C, and has collected in the vessel B, the remaining portion which is still in the form of gas and consists principally of hydrogen flows through the interchanger K and is thereby further reduced in temperature by the counter-current of expanded hydrogen. As the result of this practically all the remaining constituents of the gas mixture except hydrogen are here liquefied and collect in the vessel L, and are allowed to unite with the liquid separated in the vessel B, and then to expand as in Figs. 1 and 2 through the throttle valve D to evaporate in the interchanger C, to become raised in temperature and to ultimately escape at E. The portion which does not collect in L but remains in the gaseous form and which is now nearly pure hydrogen, is expanded through the throttle valve F, passes in counter-current to the previously partly purified hydrogen through the interchanger K and then in counter-current to the compressed gas mixture in the interchanger C and ultimately passes out at G.

Having fully described my invention what I claim as new and desire to secure by Letters-Patent, is,—

1. In the production of practically pure hydrogen from a mixture of gases, the separation of a portion of the mixture by liquefaction in such a way that the incoming compressed gas mixture is brought into heat interchanging relation with separated portions of the gas mixture previously expanded, and is split up into a liquid portion composed principally of all other constituents and a gaseous portion composed principally of hydrogen and that then both these portions are individually expanded and are led in two separate streams in counter-current and heat interchanging relation to the incoming compressed gas mixture.

2. In the production of practically pure hydrogen from a mixture of gases, the separation of a portion of the mixture by liquefaction in such a way that the incoming compressed gas mixture is brought into heat interchanging relation with separated portions of the gas mixture which have been previously expanded and subsequently cooled by liquid air or liquid nitrogen, whereby the compressed gas mixture is split up into a liquid portion composed principally of all the other constituents and a gaseous portion composed principally of hydrogen, and that then both these portions are individually expanded and are led in two separate streams in counter-current and heat interchanging relation to the incoming gas.

3. In the production of practically pure hydrogen from a mixture of gases, the separation of a portion of the mixture by liquefaction in such a way that the incoming compressed gas mixture is brought into heat interchanging relation with separated portions of the gas mixture previously expanded and subsequently cooled by liquid air or liquid nitrogen under a reduced pressure, whereby the gas mixture is split up into a liquid portion composed principally of all the other constituents, and a gaseous portion composed principally of hydrogen, and that then both of these portions are individually expanded and are led in two separate streams in heat interchanging relation to the incoming gas mixture.

4. In the production of practically pure hydrogen from a mixture of gases, the separation of a portion of the mixture by liquefaction in such a way that the incoming compressed gas mixture is brought into heat interchanging relation with separated portions of the gas mixture previously expanded, whereby the compressed gas mixture is split up into a liquid portion composed principally of all the other constituents and a gaseous portion composed principally of hydrogen, passing the gaseous portion prior to its expansion into heat interchanging relation with a separated portion of such gaseous portion previously expanded, and flowing counter-current thereto, whereby practically all the remaining constituents except the hydrogen are liquefied before expansion by the reduction of their temperature thus produced and are led away separately.

In testimony whereof, I have signed this specification in the presence of two subscribing witnesses.

CARL von LINDE.

Witnesses:
A. V. W. COTTER,
MATHILDE K. HELD.